United States Patent Office 3,428,624
Patented Feb. 18, 1969

3,428,624
CALCIUM SUGAR PHOSPHATE PROCESS
Arthur D. F. Toy, Stamford, Conn., assignor, by mesne assignments, to The Colonial Sugar Refining Company Limited, Sydney, Australia, a corporation of Australia
No Drawing. Filed Sept. 28, 1966, Ser. No. 582,492
U.S. Cl. 260—234                    7 Claims
Int. Cl. C08b 19/00

ABSTRACT OF THE DISCLOSURE

Process for producing calcium sugar phosphate reaction products containing substantially no calcium chloride and being substantially less hygroscopic than calcium sugar phosphates hitherto available. The process involves introducing a sodium phosphate into a solution obtained by the reaction in solution of sugar, phosphorus oxychloride and a calcium oxy-compound, and thereafter recovering the reaction product.

---

The present invention relates to the production of calcium sugar phosphates. More particularly, the present invention is directed to a novel process for producing new and useful calcium sugar phosphate reaction products. The novel process of the present invention obviates the costly separation of calcium chloride from calcium sugar phosphate reaction products and furnishes compositions which are substantially less hygroscopic than those available in the past.

In recent years there has been a considerable interest in sugar phosphate reaction mixtures comprising a sugar phosphate salt in complex association with a normally water-insoluble inorganic phosphate such as, e.g., is disclosed in the copending U.S. patent application Ser. No. 414,074, filed Nov. 27, 1964, now U.S. Patent No. 3,375,-168, granted on Mar. 26, 1968. The calcium sucrose phosphate reaction mixture is of particular commercial importance because of its utility as a cariostatic agent, feed supplement, and general food additive Unfortunately, the calcium sucrose phosphate (CSP) reaction mixtures are expensive to recover because of the multiple alcohol extractions required to remove certain undesirable side products, namely, calcium chloride. Failure to remove the calcium chloride from the solid calcium sucrose phosphate reaction mixture yields a product which is deliquescent, i.e., it readily becomes liquid when exposed to atmospheric moisture for a short period of time. It is, therefore, the object of the present invention to overcome and eliminate the deficiencies inherent in the prior art relating to the production of calcium sugar phosphate and to provide a novel and improved process and product in this art.

Another object of the present invention is to furnish a process for producing calcium sugar phosphate reaction mixtures which obviates the need for separation of a calcium chloride from the reaction products.

Another object of the present invention is to furnish a process for producing calcium sucrose phosphate reaction mixtures which are not appreciably hygroscopic and which are substantially free of calcium chloride.

Other objects and advantages of the present invention will become readily apparent to those skilled in this art from the following description and disclosure.

I have now discovered that the addition of a suitable sodium phosphate to the reaction mixture or product of the phosphorylation of a sugar, e.g., sucrose, in the presence of a suitable calcium oxy-compound avoids the presence of any substantial amount of calcium chloride in the calcium sugar phosphate product. Ostensibly, the calcium and chloride react with the sodium phosphate to yield the dihydrate of calcium acid orthophosphate and sodium chloride, which two substances are acceptable in food products.

It has been found that the product made in accordance with the process of the present invention is unexpectedly improved in that it exhibits a significant decrease in hygroscopicity as compared with product made in substantially the same manner but without the addition of a suitable sodium phosphate. Preferred sodium phosphates include disodium hydrogen phosphate, and trisodium phosphate. Suitable calcium oxy-compounds include calcium oxide, calcium hydroxide and calcium carbonate.

The novel process in accordance with the present invention can be represented formulistically as follows:

(1)
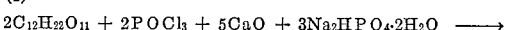
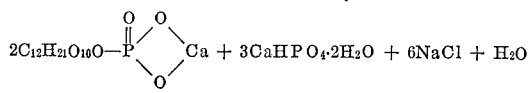

The sodium phosphate is preferably added to the reaction mixture in an amount stoichiometrically equivalent to the theoretically predicted amount of calcium chloride which would normally form in accordance with Equation 1, above. Nevertheless, the addition of a lesser amount of sodium phosphate is within the scope of the invention where some calcium chloride can be tolerated in the final product or where it can be removed by subsequent processing steps in an economically practicable manner.

A preferable method of carrying out the process of the present invention comprises the following procedure. Sucrose dissolved in water is introduced to a suitable reaction zone and preferably diluted with additional water to obtain the desired concentration. The reaction is preferably carried out in a dilute condition which appears to favor the production of granular product. The minimum degree of dilution which will produce a product satisfactory for any given application can be readily determined by those skilled in the art. The calcium oxy-compound, preferably in the form of slaked lime, is added to the sucrose solution which is cooled to a suitable reaction temperature which is, most preferably, maintained between about 0° and about 15° C. Phosphorus oxychloride is added to the solution, preferably in a gradual manner over a period of time while the mixture is vigorously agitated. Sodium phosphate is introduced into the reaction zone preferably following completion of addition of the POCl₃, although it should be understood that satisfactory results can be obtained by the addition of sodium phosphate to the reaction zone prior to or concomitantly with the addition of POCl₃.

The phosphorylation of sucrose in accordance with the method of the present invention can be carried out in any suitable reaction medium. For example, the reaction can be carried out in the presence of water or in the presence of water and chloroform or trichloroethylene. On the other hand, the phosphorylation reaction can be carried in a medium, e.g., ethanol, in which calcium sucrose phosphate is insoluble.

The product of the process can be recovered from the phosphorylation reaction product by any suitable method. When the phosphorylation is carried out in the presence of a solvent such as trichloroethylene, the mixture is preferably withdrawn from the reaction zone and centrifuged to remove suspended solids and trichloroethylene. Ethanol is then added with stirring in order to precipitate the calcium sucrose phosphate product. An alternative, preferred method of recovering the product involves merely evaporating to dryness the product of the phosphorylation reaction zone.

Having thus described the invention in general terms, reference is now made to specific examples which should not be construed as unduly limiting thereof.

EXAMPLE 1

A solution of 280 lbs. of sucrose and 14 gallons of water was mixed with 65 gallons of additional water and 150 lbs. of slaked lime in a reaction vessel. Additional water was then added to adjust the volume to 130 gallons. The solution was cooled to 5° C. and maintained at this temperature for eight hours, during which period 120 lbs. of phosphorus oxychloride dissolved in 120 lbs. of trichloroethylene, was gradually added with vigorous agitation. When the reaction was complete, the mixture was centrifuged to remove suspended solids and trichloroethylene. A quantity of ($Na_2HPO_4 \cdot 7H_2O$) solution (containing 19 grams solids/100 ml. solution) equivalent to chloride, was added to the reaction mixture with good agitation. The mixture was transferred to an evaporating basin and dried over night in a vacuum oven at 50° C. The product (small hard lumps of about ¼–½″ average diameter) was ground to a fine powder. The product had a salty taste and analyzed as shown in the following table.

TABLE 1.—ANALYSIS OF PRODUCT MADE BY PROCESS OF EXAMPLE 1

| Component | (1) Reaction Mixture (200 ml.) (grams) | (2) Added 100 ml. $Na_2HPO_4$ Solution (grams) | (3) Equals (1)+(2) (grams) | Product Percent Dry Weight (Calculated) | Product Found, Percent Dry Weight |
|---|---|---|---|---|---|
| Ca++ | 8.77 | | 8.77 | 10.57 | 10.51 |
| Cl- | 9.40 | | 9.40 | 11.33 | 11.68 |
| P total | 2.343 | 4.286 | 6.63 | 8.00 | 8.64 |
| P inorganic | 0.487 | 4.286 | 4.77 | 5.75 | 5.75 |
| Sucrose | 14.25 | | 14.25 | 17.2 | 17.4 |
| Total solids | 63.92 | 19.06 | 82.98 | | |

EXAMPLE 2

This example is carried out in the same manner as Example 1 except that $Na_3PO_4$ is used in place of $Na_2HPO_4$ with like results.

EXAMPLE 3

This example is presented in order to illustrate the recovery of the product of the present invention by means of alcohol precipitation instead of by evaporation to dryness as in Example 1. To 232 grams (200 ml.) of the phosphorylation reaction mixture produced in accordance with the reaction procedure of Example 1, a 26.7% solution of ($Na_2HPO_4 \cdot 7H_2O$) was added in an amount equivalent to the chloride ion. The solid was precipitated by slow addition of ethyl alcohol to the above solution to bring it to 80% alcohol by volume. The addition of alcohol took place over one hour and the mixture was agitated thoroughly during this period. After settling overnight the supernatant solution was poured off, the precipitate filtered and washed with a total of 80 ml. of ethanol, then 2× 10 ml. ether and dried overnight at 50° C. The yield was 55.6 grams of reaction product. The analysis of this material is presented in Table 2.

EXAMPLE 4

To 100 grams of a phosphorylation reaction product containing calcium sucrose phosphate made by procedure like that set forth in Example 1 except that trichloro-ethylene was omitted, which mixture contained about 0.173 mole of chloride ion, was added 0.0865 mole of anhydrous disodium hydrogen phosphate (molecular weight 141.96) in 30 cc. of water. Seventy (70) cc. of water were then added to the resulting mixture, which upon shaking gelled. This was done in a 1 liter vessel such that evaporation could readily take place. The resulting mixture was evaporated at 100° C. under a pressure of 200 mu of mercury. About 50.9 g. of a white, chunky solid material was obtained by this procedure. The product did not deliquesce when exposed to the atmosphere.

TABLE 3

| Component: | Percent by weight |
|---|---|
| Calcium | 10 |
| Chlorine | 12.53 |
| Organic phosphorus | 3.02 |
| Total phosphorus | 8.88 |
| Inorganic phosphorus | 5.86 |
| Sucrose | 28.6 |

EXAMPLE 5

To 100 grams of a phosphorylation reaction mixture containing calcium sucrose phosphate made in accordance with the procedure like that described in Example 1, which had a chlorine concentration of 0.166 mole, 0.083 mole of anhydrous disodium phosphate was added in 100 cc. water. Solid product was recovered by the method specified in Example 4. The product did not deliquesce when exposed to the atmosphere. The analysis of the product is set forth below in Table 4.

TABLE 4

| Component: | Percent by weight |
|---|---|
| Calcium | 10.6 |
| Chlorine | 12.13 |
| Organic phosphorus | 2.45 |
| Total phosphorus | 8.98 |
| Inorganic phosphorus | 6.53 |
| Sucrose | 19.4 |

EXAMPLE 6

In this example the product made in accordance with procedure like that specified in Example 1 was recovered by evaporation to dryness. No sodium phosphate was added in this example. The product recovered in this manner was found to deliquesce in a very short period of time upon exposure to the atmosphere.

Having thus described the invention with reference to specific examples thereof, and in particular with reference to calcium sucrose phosphate, many modifications and alterations thereof will become apparent to those skilled in the art without departing from the spirit and scope of the invention. For example it is known that the phosphorylation reaction herein described and exemplified with reference to sucrose can be carried out using other sugar materials including, but not limited to galactose, arabinose, ribose, xylose, maltose, lactose, raffinose and glucose. The problem of deliquescence also exists in regard to these calcium sugar phosphates. The problem is, likewise, overcome and eliminated by the use of suit-

TABLE 2

| Component | Reaction Mixture Concentration | (1) Amount in 232 grams | (2) Added 100 ml. $Na_2HPO_4$ Solution | (3) Equals (1)+(2) | Product Amount in 55.6 grams | Product Percent Dry Weight | Product Percent Recovery |
|---|---|---|---|---|---|---|---|
| Ca++ | 0.137, g./g. dry | 8.77 | | 8.77 | 7.86 | 14.3 | 89.6 |
| Cl- | 0.147, g./g. dry | 9.40 | | 9.40 | 1.47 | 2.7 | 15.6 |
| P total | 0.037, g./g. dry | 2.34 | 4.33 | 6.68 | 6.72 | 12.2 | 100.6 |
| P inorganic | 0.0076, g./g. dry | 0.49 | 4.33 | 4.82 | 4.78 | 8.7 | 99.2 |
| Sucrose | 0.223, g./g. dry | 14.25 | | 14.25 | 3.70 | 6.7 | 26.0 |
| Total solids | 27.55% | 63.92 | 19.27 | 83.19 | 55.0 | | | able sodium phosphates and, thus, processes involving such materials are understood to be within the scope of the present invention. It should be understood that the process of the present invention can be carried out by employing stoichiometric quantities of lime, $POCl_3$, and sugar as set forth in copending application 262,230, filed Mar. 1, 1963, now abandoned, or by employing a stoichiometric excess of an acid acceptor such as is disclosed in German Patent No. 247,809 granted Feb. 3, 1910.

What is claimed is:

1. In the process for the manufacture of a calcium sugar phosphate in which a sugar is phosphorylated with $POCl_3$ in the presence of a calcium oxy-compound in a reaction solution, the improvement which comprises introducing a sodium phosphate into the reaction solution in an amount based upon the chloride ion present in solution, and thereafter recovering the said calcium sugar phosphate substantially free of calcium chloride and substantially nondeliquescent.

2. The process of claim 1 in which said sugar is selected from the group consisting of sucrose, galactose, arabinose, ribose, xylose, maltose, lactose, raffinose and glucose.

3. The process of claim 1 in which said sugar is sucrose.

4. The process of claim 1 in which said sodium phosphate is selected from the group consisting of disodium hydrogen phosphate and trisodium phosphate.

5. The process of claim 1 in which said sodium phosphate comprises disodium hydrogen phosphate.

6. The method of claim 1 in which said sodium phosphate is added to the reaction solution in an amount which is about stoichiometrically equivalent to the amount of calcium chloride which would normally form.

7. In the process for the manufacture of calcium sucrose phosphate in which sucrose is phosphorylated with $POCl_3$ in the presence of a calcium oxy-compound in a reaction solution, the improvement which comprises introducing disodium hydrogen phosphate into said reaction solution in an amount which is about stoichiometrically equivalent to the amount of calcium chloride which would normally form, and thereafter recovering calcium sucrose phosphate substantially free of calcium chloride and substantially nondeliquescent.

References Cited

FOREIGN PATENTS

| | | |
|---|---|---|
| 247,809 | 7/1912 | Germany. |
| 819,359 | 9/1959 | Great Britain. |
| 1,351,134 | 12/1963 | France. |

LEWIS GOTTS, *Primary Examiner.*

JOHNIE R. BROWN, *Assistant Examiner*